March 20, 1962  R. A. KOETTING  3,025,755
VISUAL FIELD EXAMINATION DEVICE
Filed Sept. 22, 1958  3 Sheets-Sheet 1

INVENTOR.
ROBERT A. KOETTING
BY
*Jerome A. Gross,*
ATTORNEY

March 20, 1962 R. A. KOETTING 3,025,755
VISUAL FIELD EXAMINATION DEVICE
Filed Sept. 22, 1958 3 Sheets-Sheet 2

INVENTOR.
ROBERT A. KOETTING
BY
ATTORNEY

March 20, 1962 — R. A. KOETTING — 3,025,755
VISUAL FIELD EXAMINATION DEVICE
Filed Sept. 22, 1958 — 3 Sheets-Sheet 3
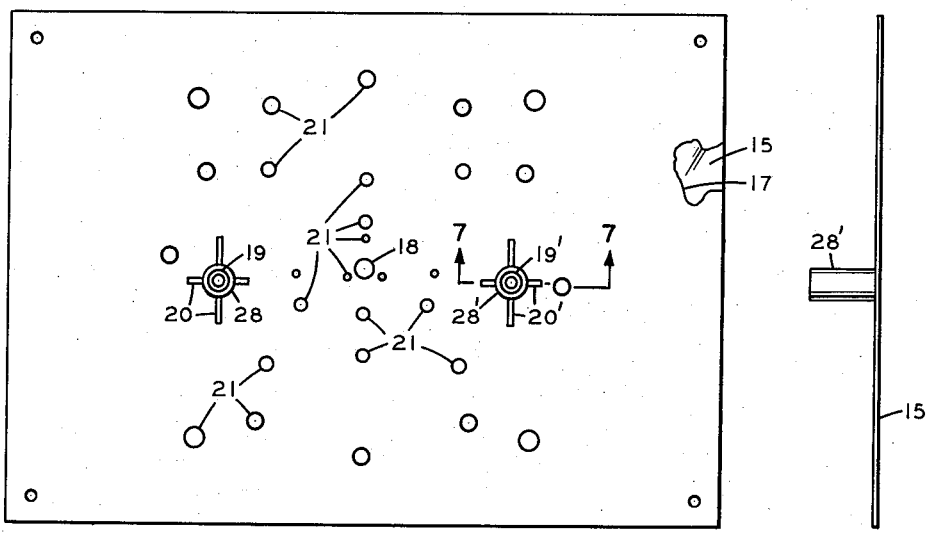
FIG. 3
FIG. 4
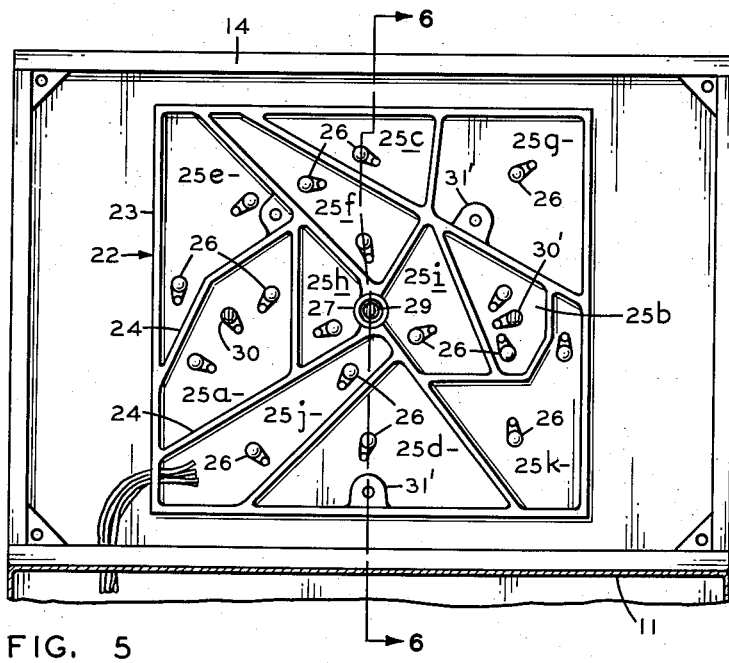
FIG. 5
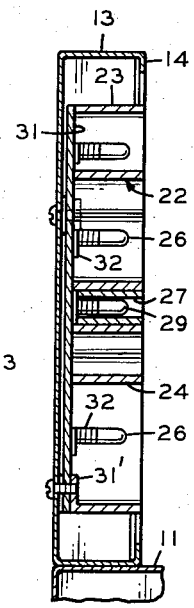
FIG. 6
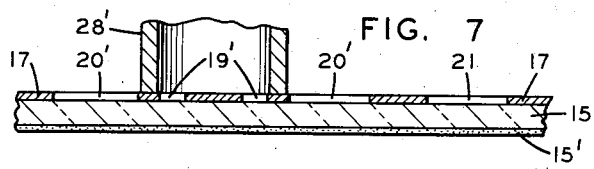
FIG. 7
INVENTOR.
ROBERT A. KOETTING
BY Jerome A. Gross
ATTORNEY

United States Patent Office 3,025,755
Patented Mar. 20, 1962

3,025,755
VISUAL FIELD EXAMINATION DEVICE
Robert A. Koetting, St. Louis County, Mo., assignor of one-half to Robert C. Mueller, Moberly, Mo., and one-half to Roberts Instruments Company, Moberly, Mo., a corporation of Missouri
Filed Sept. 22, 1958, Ser. No. 762,589
4 Claims. (Cl. 88—20)

The present invention relates to devices for examining the visual field, and particularly to that type of device wherein the patient's gaze is intended to be fixed centrally throughout the examination while extra-foveal vision is tested by displaying test points at various angular positions from the center of a screen.

Such an examination is invalidated if the patient's gaze wanders from center; yet the time necessary for a reasonably thorough examination of the visual field of an eye makes it difficult for a patient to hold his gaze on a point which does not of itself draw attention. Especially is this true when the patient observes and is asked to report upon the visibility of a succession of test points tachistoscopically presented in the extra-foveal field.

One type of visual field examination device involves the use of a series of printed cardboard targets, each having a printed target dot in the center and a pattern of fluorescent paint dots, tachistoscopically activated by an ultra-violet light. Successive cards, each with a different pattern, are put into place for viewing, and are then removed from viewing position. To handle a patient under these conditions so that his gaze is not diverted from the central target point nor his face drawn backward away from the manipulated cards, requires considerable skill and care.

Such prior art devices which employ printed cards have other shortcomings, including the following: failure of the successive cards to align with each other accurately; the tendency of the cards to become soiled and bent; and the possibility that the light within the room may make the fluorescent paint dots visible.

One purpose of the present invention therefore, is to provide a wholly new instrument, based on the tangent screen, which nevertheless serves the functions of such prior testing devices without their drawbacks.

Other objects of the present invention include the following:

Providing a visual field examination device including a central target which affirmatively attracts the gaze of the patient during the examination procedure;

Providing position check means whereby the distance from the head of the patient to the device is initially set and both the head position and the fixation of the patient's gaze are verified automatically throughout the progress of the examination;

Providing for examination of the visual field in two different manners, preferably in two stages: first, by the programmed presentation of pre-selected groups of test points in various portions of the visual field; and second by minute examination of those portions of the field of vision which may be thought to be impaired and warrant more exhaustive attention than the programmed presentation itself affords.

These and other objects which will be apparent from this specification are attained in the device illustrated.

FIGURE 3 is an elevational view of the reverse side of the screen when removed from the device.

FIGURE 4 is a side view of the screen so removed.

FIGURE 5 is a front elevational view of the light housing as seen when the screen is removed.

FIGURE 6 is a sectional view taken along line 6—6 of FIGURE 5.

FIGURE 7 is an enlarged fragmentary section of the screen taken along line 7—7 of FIGURE 3.

Figure 1:
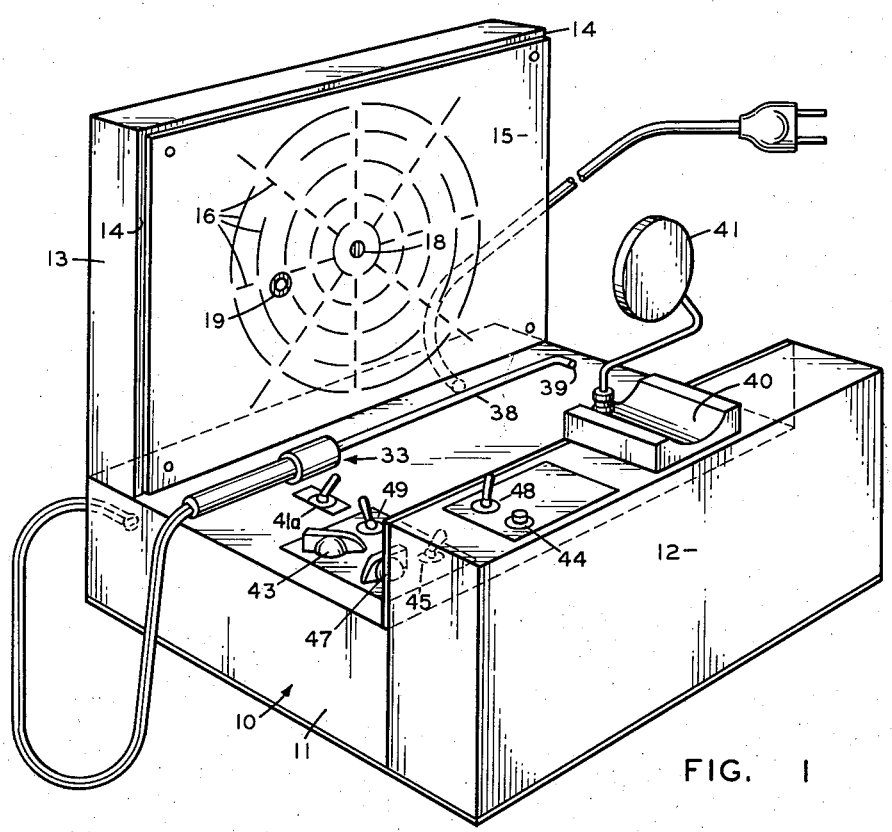
FIGURE 1 is a perspective view of a visual field testing device embodying the present invention, with the central target light and left blind spot position check light (both lined to show the color red) shown on and glowing through the translucent screen of the device.
Figure 2:
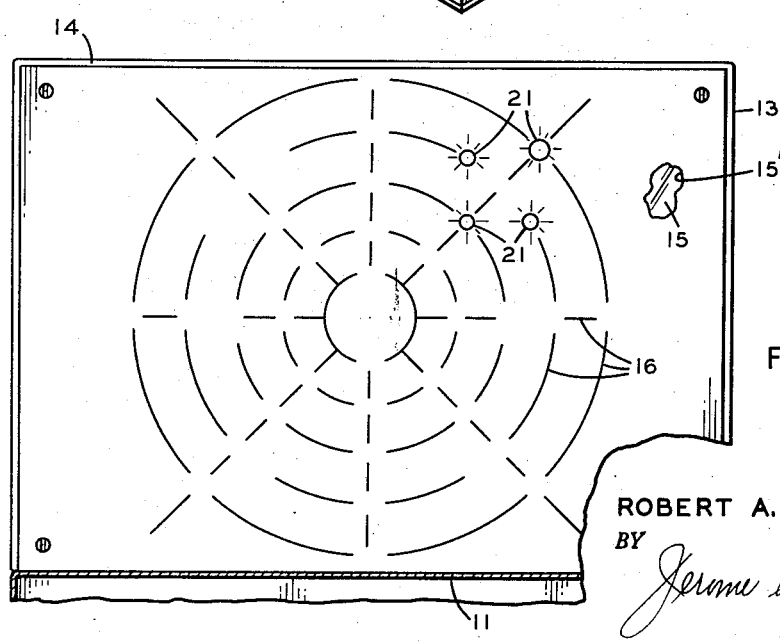
FIGURE 2 is an elevational view of the said translucent screen showing a light glowing through test positions thereof in the upper right quadrant.

Referring to the drawings now by their detail parts numbers, the specific embodiment illustrated in perspective in FIGURE 1 includes a chassis generally designated 10, having a base 11 of generally flat box-like proportions, a front panel 12 extending across the front edge of the base 11 and to a somewhat greater height, and the rear screen support portion 13 extending vertically upward from the base 11 along its rear edge. The screen support portion has a front edge 14 in a vertical plane parallel to the front edge of the base 11 and circumscribing an area larger than the normal field of extra-foveal vision at a viewing distance roughly equal to the distance from the front panel 12 to the front edge 14.

To the front edge 14 of the screen support portion 13 is secured a tangent screen 15 preferably formed of a sheet of translucent plastic material. On the front side of the tangent screen 15 is a translucent, preferably gray paint coat 15' over which is painted a pattern of translucent markings 16 consisting of concentric circles at distances corresponding to angular distances from the screen center (when measured from the viewing position established at the front panel 12) of 5°, 10°, 15°, 20° and 25°; also radiating lines extending outward from the 5° circle at 45° intervals. The pattern 16 contains no center markings; the red glow therethrough shown in FIGURE 1 results from energizing a hidden target light 29 hereinafter mentioned.

On its back side, as shown in FIGURE 3, the tangent screen 15 is provided with an opaque coating 17 interrupted by a number of clear spots (mostly circular dots) hereinafter referred to, through which light may be transmitted. Only when lights are energized can these be seen by a patient viewing the screen from the viewing position at the front panel 12. The opaque coating may be applied by a silk screen process.

The clear spots in the opaque coating 17 on the back side of the tangent screen 15 include the following: a central target 18 of circular area; ring-like blind spot position check markings 19, 19' spaced on the tangent screen at the optic nerve head blind spot positions for the left eye and right eye as shown in FIGURES 3 and 5; blind spot size ascertainment clear lines 20, 20' radiating from the centers of the blind spot position check rings 19, 19' on horizontal and vertical axes; and an array of circular test areas 21 (here twenty-nine in number) chosen to constitute a representative group of visual field test points. These are located at the angles and distances from the center at which representative groups of individual test points might, in normal examining procedures, be checked on the tangent screen. The use of a plurality of preselected test points is familiar in the examination of the visual fields of the eye; if normal vision is found at each of the test points, this may suffice.

Presented against the back side of the tangent screen 15 is a partitioned light housing generally designated 22, preferably formed in one piece as by casting aluminum. As illustrated in FIGURES 5 and 6, the light housing 22 comprises a square outer frame portion 23 and interior partitions 24 dividing the area within the frame portion 23 into a plurality of zones 25a through 25k, inclusive.

The zones 25a to 25k so established by the interior partitions 24 block off corresponding areas at the back side of the tangent screen 15. Zones 25a and 25b include the blind spot size ascertainment lines 20, 21. Zones 25c and 25d together include only three test points, all in the vertical line of symmetry. Each other zone includes three or four of the representative visual field test point translucent areas 21. In each zone 25a–25k is located one or more electric light bulbs 26. The lights 26 are positioned within the zones so as to provide illumination of the visual field test dots 21 included within a particular zone and in accordance with usual optometric test practice, the size of the visual field test dots 21 may vary increasingly with the distance from the central target 18.

Extending into the light housing 22 at its center, with one open end presented against the back face of the tangent screen 15, is an opaque tubular target light shield 27. Similar blind spot tubular light shields 28, 28' are adherently secured against the aft side of the tangent screen 15, as shown in FIGURES 4 and 7, so as to surround the clear areas referred to as the blind spot position check rings 19, 19', and wall them off from the blind spot size ascertainment lines 20, 21. A red target light bulb 29, and red blind spot light bulbs 30, 30' are provided within the light shields 27, 28, 28' respectively. At its back side, the light housing 22 is closed with a back plate 31, screwed to housing lugs 31' and supporting light bulb sockets 32 in position to place the bulbs as shown within the zones of the light housing 22. This prevents the room light from illuminating the translucent screen areas.

Figure 9:
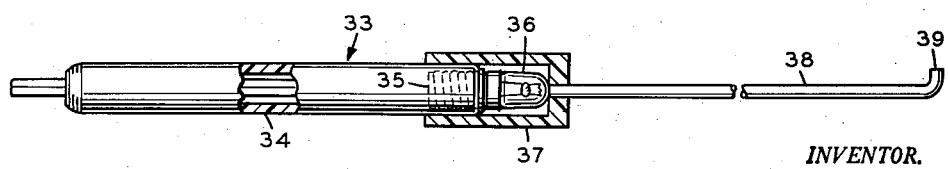
FIGURE 9 is a sectional view taken through the wand.

To supplement the array of preselected representative visual field test positions and to render the device capable for use in the usual manner of a tangent screen, a wand generally designated 33 is provided, as shown in FIGURE 9. It consists of tubular handle 34 containing a lamp socket 35, wand electric bulb 36 contained within a lamp housing 37, and a bent light-transmitting plastic rod 38 having an illuminable end face 39 turned at a 90° angle to the rod 38.

Figure 8:
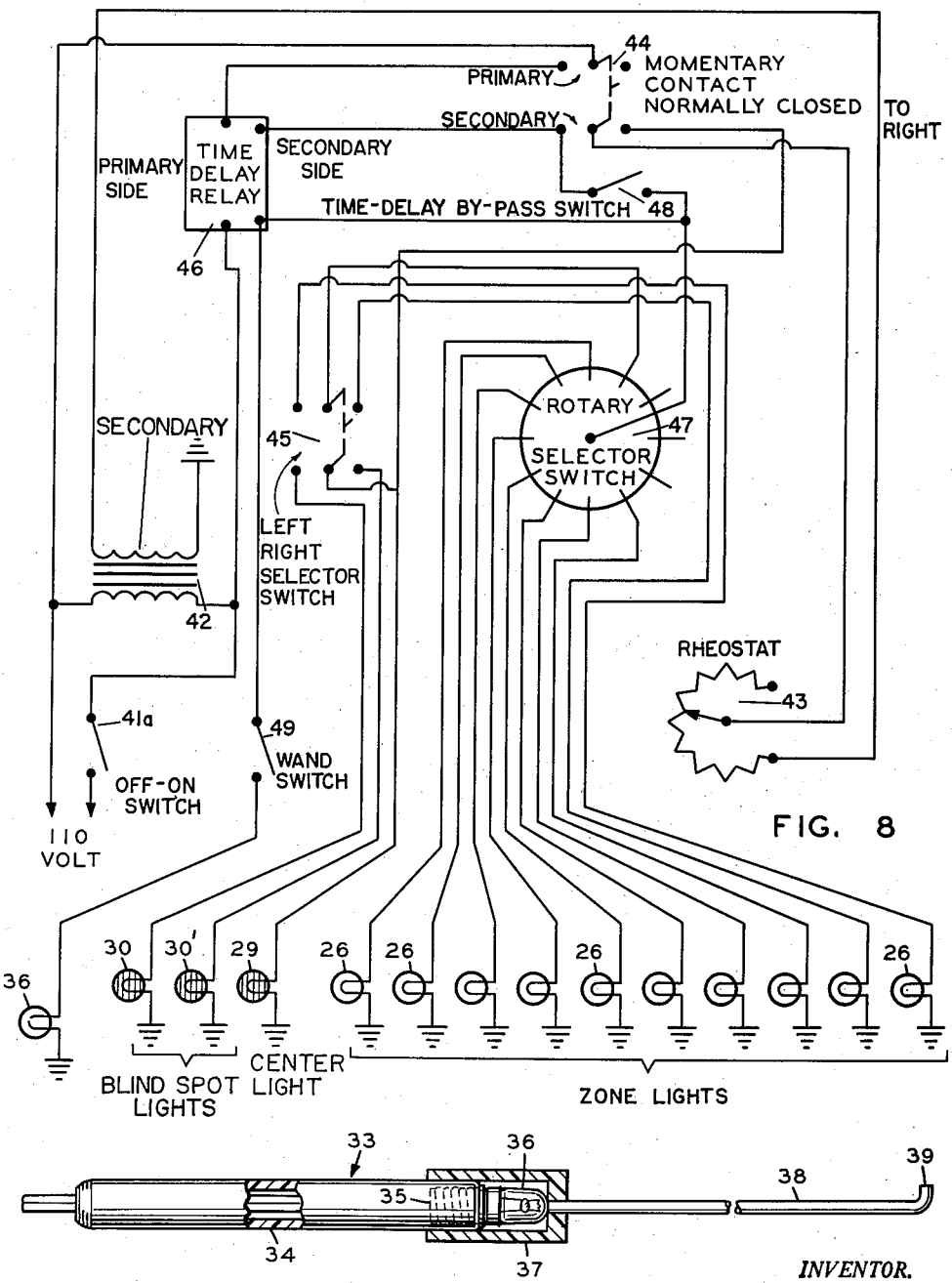
FIGURE 8 is a wiring diagram.

The wiring diagram, FIGURE 8, illustrates the operating connections and mechanisms. A single pole single throw off-on switch 41a engages the device operatively with a source of 110 volt electrical current, the voltage being reduced by a transformer 42 whose secondary current is conducted through an adjusting rheostat 43 to a momentary contact double pole double throw switch 44, normally closed to the right side as shown in FIGURE 8, to make the secondary current circuit only. With the switch 44 normally closing in this position, the center light 29 will be normally energized, and also either one or the other of the position check lights 30, 30' at the left and right blind spot positions as selected through a double pole double throw left-right selector switch 45. Through this switch and said lights, the secondary current normally passes to ground.

By momentarily actuating the double pole switch 44, depressing it to assume the left-side position shown in FIGURE 8, the primary 110 volt current is passed through the primary side of a time-delay relay 46, the secondary circuit to the center light 29 and one or the other of the blind spot lights 30, 30' is broken, but instead the secondary side of the time-delay relay 46 is put into the secondary circuit; and actuation of the relay 46 by the primary current passes the secondary current through the relay 46 to a rotary selector switch 47 and thence through a selected zone light bulb 26 to ground. A time-delay by-pass switch 48 is provided so that, optionally, the operator may prolong the time the selected zone bulb 26 is energized beyond the interval for which the time-delay relay 46 is set. The automatic opening of the time delay relay 46 de-energizes the zone bulbs 26 after a time interval—say one-fourth of a second—appropriate for the tachistoscopic display of the selected zone lights 26, and automatically reenergizes the target light 29 and blind spot light 30 or 30'.

By means of a single-pole single-throw wand switch 49, connected to the secondary side of the time-delay relay 46, the wand light bulb 36 may be selected for energization preferably tachistocopically, although a continuous display of the wand light may be desired for certain purposes, in which event the time-delay by-pass switch 48 would be thrown. The wand 33 may be used simultaneously with the lighting of one of the zones selected by the rotary selector, if this should be desired. Its illuminable end face 39 should be presented at the front side of the tangent screen with the wand handle held out of a patient's field of vision and the plastic rod 38 extending inward into the visual field.

In using the device described, the patient's chin is rested on the concave chin rest 40 provided along the upper edge of the front panel 12; and the vision of one eye of the patient is obscured by a conventional occluder 41. The red central target light bulb 29 is energized and also the red blind spot light bulb 30 or 30' for the blind spot position of the eye being tested (that is the eye whose vision is not occluded). With the patient's chin on the chin rest and the eye being tested having its gaze fixed upon the light glowing through the central target dot 18, the red light which proceeds through the blind spot position check ring 19 or 19' should not be visible. If it is visible, the position of the patient's chin is adjusted forward or backward along the chin rest until no light is seen through the blind spot position check ring 19 or 19'. At this viewing position the patient's visual field is in angular coincidence with the field plotted on the tangent screen 15.

With the position of the eye and the direction of the gaze established, the visual field of the eye is checked by the tachistoscopic display successively of the visual field test points 21 within each of the zones 25c–k and of the blind spot size lines in zones 25a–b. As the lights within a particular zone are energized, the red target light ceases to glow through the screen for the tachistoscopic interval of the display; but it reappears to the patient immediately as the lights in the zone disappear. This intermittency makes the screen centering interesting; the fact that the light disappears and reappears tends to center the patient's attention and assures against wandering of the patient's gaze. The position check lights which corresponds to the blind spot preferably appears and disappears simultaneously with the target light. However if the patient's gaze has not been diverted nor his head moved from the viewing position, he will be entirely unaware of the existence or flashing of this light. If the patient should report that he has seen a flash of red light off center spot area, the position of the patient's head should be checked and the patient advised to gaze at the glow of the central target light and notice how it blinks off as lights selected come on at the test points. This means of holding the attention of the patient on the target, and of verifying that the attention has been so held, is also of value during prolonged and minute examination of visual areas with the wand 36.

Various uses for the new device will occur to those skilled in visual field examination. Modifications for particular uses may be made without departing from the scope of the invention, which is to be construed as fully extensive with the claims hereof.

I claim:
1. A visual field examination device, comprising means for steadying the head of a patient at a viewing position, a tangent screen spaced from said steadying means whereby to subtend the angular field of vision at the distance at which the screen is spaced from the viewing position, a plurality of translucent areas through said screen including a central target area and an array of test point areas at angular positions corresponding to visual field test points, a plurality of electric lights adjacent said translucent areas, means confining the rays from said lights to the translucent areas thereadjacent, connector means through which the light adjacent the central target area is normally energized and the lights adjacent the array of test point areas are normally de-energized, together with a source of electrical energy, means for timing a pulse of electrical current for a tachistoscopic time interval and switch means operatively connecting said energy source through said timing means to said lights adjacent the test point areas and simultaneously disconnecting the light adjacent to the central target area for performing the function in which lights chosen from the normally-de-energized array are selectively energized tachistoscopically and de-energized, and in which the normally-energized target light is de-energized simultaneously with such energization of lights of the array.

2. A visual field testing device as defined in claim 1, said translucent areas including a position check spaced from the screen central angularly to correspond to the position of the optic nerve head blind spot, and a position check light at the back side of the screen adjacent said translucent position check area, said position check light being energized during the de-energization of the lights adjacent the test point areas.

3. A visual field examination device for the programmed presentation of visual field test position stimuli, comprising a tangent screen formed of translucent material and having at its back side an opaque coating interrupted with a plurality of translucent spots each located at an angle and distance corresponding to a visual field test position, a light housing at the back side of the screen having light-shielding partitions dividing the screen area into a plurality of separate zones, each zone including translucent spots corresponding in their positions to a group of test stimuli to be presented simultaneously, electric lights projecting into each zone of said housing, a selector switch having positions for connecting to the lights of said zones separately and progressively whereby to program the presentation of the groups of test stimuli zone by zone, a source of electrical current, means for timing a pulse of such current for a tachistoscopic interval, and switch and connector means to deliver such a timed pulse of current through said timing means to the lights of the zones so separately selected.

4. A visual field examination device, comprising means for steadying the head of a patient at a viewing position, a tangent screen spaced from said steadying means whereby to subtend the angular field of vision at the distance at which the screen is spaced from the viewing position, a plurality of translucent areas through said point areas at angular positions corresponding to visual field test points, a plurality of electric lights adjacent to said translucent areas, means confining the rays from said screen including a central target area and an array of test lights to the translucent areas thereadjacent, a source of electrical current, a transformer, a time-delay relay having a primary side by which the same is energized and a secondary side adapted to make a circuit for a tachistoscopic time interval, a primary circuit including the primary winding of the transformer and the primary side of the time-delay relay, a secondary circuit including the secondary winding of the transformer, a double-throw display switch having two secondary circuit leads, the first lead making a circuit including a light at the central target area, the second lead making a circuit including the secondary side of the time-delay relay, a selector switch and a light adjacent one of the test point areas, the display switch being normally closed to energize the first lead of the secondary circuit and being actuatable momentarily to break said circuit and to energize the second lead of the secondary circuit and simultaneously to make the primary circuit through the time-delay relay, whereby the central target light is de-energized and a selected test point area light is energized for a tachistoscopic time interval.

References Cited in the file of this patent

UNITED STATES PATENTS

| | | |
|---|---|---|
| 1,780,291 | Cameron | Nov. 4, 1930 |
| 1,920,428 | Pank | Aug. 1, 1933 |
| 2,376,554 | Ranoe | May 22, 1945 |
| 2,564,794 | Shekels | Aug. 21, 1951 |
| 2,718,227 | Powell | Sept. 20, 1955 |
| 2,835,162 | Harrington et al. | May 20, 1958 |

FOREIGN PATENTS

| | | |
|---|---|---|
| 694,128 | Great Britain | July 15, 1953 |

OTHER REFERENCES

American Journal of Ophthalmology, Zugsmith et al., vol. 32, November 1949, pages 1573–1576.